United States Patent [19]

Littlehorn

[11] Patent Number: 5,076,741

[45] Date of Patent: Dec. 31, 1991

[54] PLUG EJECTING HOLESAW

[76] Inventor: James M. Littlehorn, P.O. Box 265, Seabeck, Wash. 98380

[21] Appl. No.: 612,595

[22] Filed: Nov. 13, 1990

[51] Int. Cl.5 ............................................. B23B 51/05
[52] U.S. Cl. ...................................... 408/68; 408/204; 408/703
[58] Field of Search .................. 408/67, 68, 204, 208, 408/209, 703, 205–207, 199; 144/21, 23, 24

[56] References Cited

U.S. PATENT DOCUMENTS 3,267,975 8/1966 Enders .................................. 408/200
3,390,596 7/1968 Trevathan ............................. 408/68
4,148,593 4/1979 Clark .................................. 408/703 X
4,741,651 5/1988 Despres .............................. 408/703 X
4,968,189 11/1990 Pidgeon ............................. 408/204 X Primary Examiner—Steven C. Bishop
Attorney, Agent, or Firm—Robert W. Jenny

[57] ABSTRACT

The subject holesaw is similar to conventional holesaws. However, it has no shoulder stop on the mandrel and extended threads on the mandrel so that after a hole is cut the clutch is moved well away from the saw, the saw is held from rotating and the mandrel is threaded further into it so that its end ejects the plug.

2 Claims, 1 Drawing Sheet

PLUG EJECTING HOLESAW

BACKGROUND OF THE INVENTION

1. Field

The subject invention is in the field of apparatus used for making holes in materials, apparatus such as twist drills, fly cutters and hole saws. It is specifically in the field of hole saws having mandrels which are held in the chucks of drill presses, hand held drills and the like.

2. Prior Art

The U.S. patents listed here cover a variety of such hole saws.

| | |
|---|---|
| 2,349,400 | 3,837,759 |
| 2,794,469 | 4,036,560 |
| 3,267,975 | 4,148,593 |
| 3,784,316 | |

In general hole saws comprise a mandrel, the saw, a dog clutch and a pilot drill. The drill is coaxial with the mandrel and held in place in a hole in the mandrel by a set screw. The saw is a section of tubing with saw teeth at one end and a cap at the other. The cap has a threaded hole at its center whereby the saw can be threaded onto threads on the mandrel until it reaches a shoulder stop. The dog clutch is a collar which fits around and slides axially on a cylindrical surface on the mandrel and is kept from rotating on the mandrel by a key and keyway, mating flats on the mandrel and in the collar hole or the like. Pins extending from one face of the collar engage holes in the cap of the saw when the collar is moved toward the cap and disengage from the holes when the collar is moved away from the cap. When the pins engage the holes, torque is transmitted to the saw from the mandrel via the key and keyway or the like and the pins in the holes in the cap. When the collar is moved away from the cap, disengaging the pins from the holes, the saw can be threaded off the mandrel.

In use, the pilot drill extends beyond the saw and enters the work at the center of the hole to be cut by the saw, the saw teeth cut a cylindrical slit through the material and the cylindrical piece of material cut is called a plug and remains in the saw when the saw is removed from the work.

Removing the plug from the saw is generally not easy and can often be difficult. In any case, it often takes more time to remove the plug than it does to saw the hole, thereby seriously degrading the cost effectiveness and convenience of using holesaws.

It is the prime objective of the subject invention to provide a holesaw incoporating features which facilitate the removal of the plug from the saw. Further objectives are that incorporation of these features will not significantly increase the cost of the holesaw nor degrade its durability.

SUMMARY OF THE INVENTION

The subject invention is a holesaw which incorporates features which facilitate removal of the plug produced each time a hole is cut by the saw. The subject holesaw can be described by defining the differences between it and the prior art saw described above. The primary differences are: (1) the threaded portion on the mandrel is longer than on prior art mandrels, the length being approximately equal to the length of the saw cylinder and (2) there is no shoulder stop on the mandrel. In use, to prepare to cut a hole the saw is threaded into a position on the mandrel at which the pilot drill extends beyond the saw the necessary distance and the collar is slid along the mandrel to engage the pins in the holes. When the hole has been cut and the saw removed from the hole, the collar is slid along the mandrel to disengage the pins from the hole. Then, the saw is hand held from rotating and the mandrel is rotated, threading it into the saw so that its end pushes the plug from the saw.

The invention is decribed in more detail below with reference to the attached drawings.

DETAILED DESCRIPTION OF THE INVENTION

Figure 1:
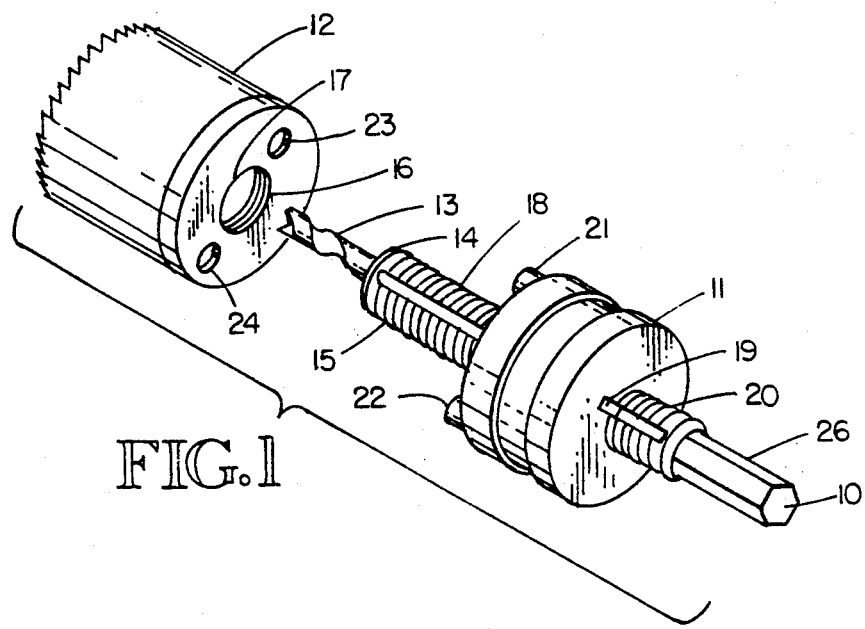
FIG. 1 is a semi-exploded perspective view of the subject holesaw.

The subject invention is a holesaw incorporating features which facilitate removal of the plug which is lodged in the saw after a hole is cut. FIG. 1 is a semi-exploded perspective view of the holesaw which comprises mandrel 10, collar 11, saw 12 and pilot drill 13. The pilot drill is seated in a hole in end 14 of the mandrel and held in place by set screw 15. The threads 16 in hole 17 in the saw thread onto threaded segment 18 on the mandrel. The collar slides on the mandrel and is kept from rotating on it by key 19 in the collar engaging keyway 20 in the mandrel. Pins 21 and 22 in the collar engage holes 23 and 24 in cap 25 of the saw when the saw is threaded onto the mandrel and the collar is moved to engage the pins in the holes. The holes and pins are off the centers of the collar and cap. The key, collar and pins transmit torque from the mandrel to the saw. Hexagon section 26 of the mandrel assures reliable engagement of the mandrel in the chuck used to drive it while a hole is cut.

Figure 2:
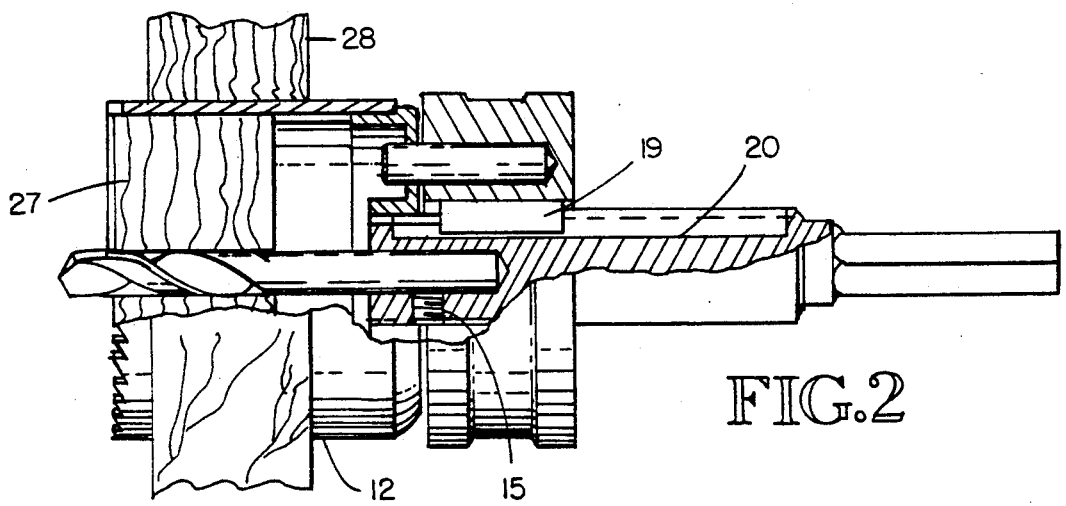
FIG. 2 is a sectional view through the longitudinal centerline of the holesaw showing the saw at the completion of cutting of a hole.

FIG. 2 is a sectional view through the longitudinal centerline of the saw at the completion of cutting of a hole. Key 19 and keyway 20 are rotated 90° into this view for purposes of this description. Plug 27 has been cut from material 28 and is lodged in the saw 12.

Figure 3:
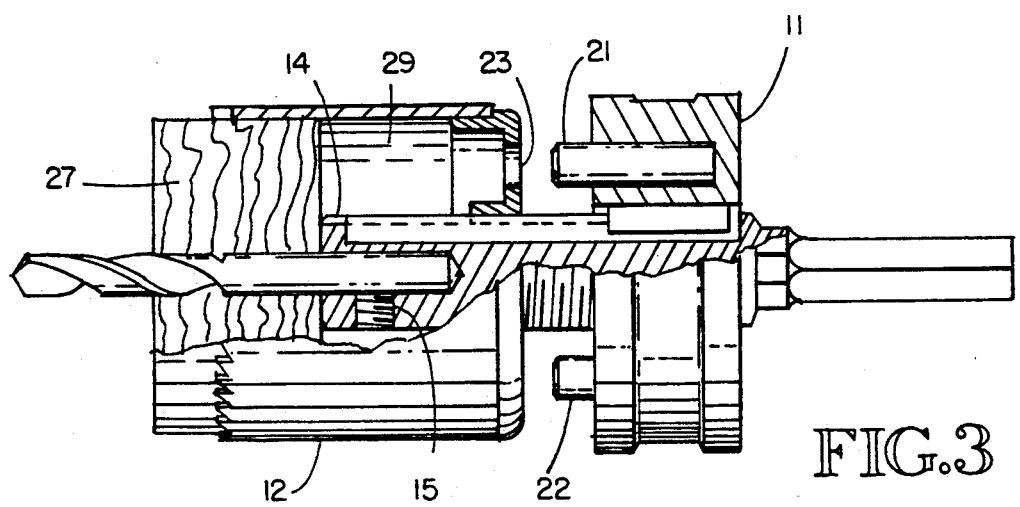
FIG. 3 is a view similar to that of FIG. 2 but showing the holesaw during ejection of the plug.

In FIG. 3, a view similar to that of FIG. 2 but showing the plug being ejected, collar 11 has been moved away from the saw, disengaging pins 21 and 22 from holes 23 and 24, hole 23 showing in this view, the mandrel is being threaded further into cavity 29 of the saw with mandrel end 14 forcing plug 27 from the cavity, saw 12 being held by hand or any appropriate tool to keep it from rotating with the mandrel. The length of the threaded segment on the mandrel is such that the mandrel can be threaded into the saw cavity a distance in the range of 80% to 110% of the length of the saw.

With the concept as described the saw is always rigidly fastened to the arbor. Also, since the plug ejection force is applied at the center of the plug by the arbor there is a minimum tendency for restriction of ejection of the plug by cocking of the plug in the saw. The saw does not have to be removed from the arbor and all core material is completely removed. This is important when the saw is used for core sampling; i.e. extracting a sample of material.

In sampling materials which are not well integrated it is helpful to insert a washer over the pilot drill and against the end of the mandrel. With the outside diameter of the washer just less than the inside diameter of the saw, the washer sweeps the full volume of the cavity of the saw, assuring that the full core sample is ejected from the saw.

It is considered to be understandable from this description that the invention meets its objectives. It incorporates features which facilitate the removal of plugs from the saw. Its cost is not increased significantly if at all relative to the cost of conventional holesaws, any potential for such an increase being the increased length and additional threading of the mandrel. Its reliability is equivalent to that of conventional holesaws.

It is also considered to be understood that while one embodiment of the invention is described herein, other embodiments and modifications of the one described are possible within the scope of the invention which is limited only by the attached claims.

I claim:

1. A hole saw comprising a saw, a dog clutch and a mandrel having a threaded segment having a first length,
    said saw being a cylinder having a cavity, a first end and a second end with saw teeth at said first end and a cap on said second end, said cap having a center and a threaded hole at said center such that said saw can be threaded onto said threaded segment on said mandrel, said cap also having at least one hole off said center,
    said dog clutch comprising a collar slidable on said mandrel, means for preventing rotation of said collar on said mandrel and at least one pin extending from said collar,
whereby with said collar moved to engage said at least one pin in said at least one hole said dog clutch is engaged and said mandrel can drive said saw and with said collar moved away from said saw such that said at least one pin does not engage said at least one hole, said mandrel can be threaded further into said cavity.

2. The holesaw of claim 1 in which said saw has a second length and said first length is 80% to 110% of said second length.

* * * * *